United States Patent
Kondo et al.

(10) Patent No.: US 9,499,028 B2
(45) Date of Patent: Nov. 22, 2016

(54) FRAME BODY-EQUIPPED VEHICLE WINDOW PLATE-LIKE BODY, AND METHOD FOR ASSEMBLING FRAME BODY-EQUIPPED VEHICLE WINDOW PLATE-LIKE BODY

(71) Applicant: Asahi Glass Company, Limited, Tokyo (JP)

(72) Inventors: Takanobu Kondo, Tokyo (JP); Kunihiko Kawashima, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 14/724,462

(22) Filed: May 28, 2015

(65) Prior Publication Data

US 2015/0258876 A1 Sep. 17, 2015

Related U.S. Application Data

(63) Continuation of application No. PCT/JP2013/081447, filed on Nov. 21, 2013.

(30) Foreign Application Priority Data

Nov. 29, 2012 (JP) .................................. 2012-261397

(51) Int. Cl.
*B60J 1/10* (2006.01)
*B60J 1/00* (2006.01)
(Continued)

(52) U.S. Cl.
CPC ............ *B60J 1/007* (2013.01); *B32B 37/1284* (2013.01); *B32B 37/142* (2013.01);
(Continued)

(58) Field of Classification Search
CPC ...... A01B 35/20; A01B 43/00; A01B 49/02; B67D 9/02; E01C 11/126; H01L 2924/00014; H01L 2924/00; H01L 2224/48091; H01L 2224/48247; H01L 2224/45144

USPC ................................ 296/146.15; 264/272.17
See application file for complete search history.

(56) References Cited

U.S. PATENT DOCUMENTS 3,659,896 A * 5/1972 Smith .................. C03C 27/048
296/93
3,759,004 A * 9/1973 Kent ........................ F28D 7/08
52/204.597

(Continued)

FOREIGN PATENT DOCUMENTS

FR            2965229       3/2012
JP            2-182423      7/1990

(Continued)

OTHER PUBLICATIONS

U.S. Appl. No. 14/505,862, filed Oct. 3, 2014, Kondou, et al.

(Continued)

*Primary Examiner* — Kiran B Patel
(74) *Attorney, Agent, or Firm* — Oblon, McClelland, Maier & Neustadt, L.L.P.

(57) ABSTRACT

The present invention provides a plate-like body with a frame attached thereto for a vehicle window and a process for assembling the plate-like body with a frame attached thereto for a vehicle window, which are capable of providing excellent assembling performance, achieving high durability and providing a decorative member with high fitting accuracy to a resin frame in spite of being in a mode where the decorative member is post-fitted to the resin frame.

In the process for assembling the plate-like body with a frame attached thereto for a vehicle window according to the present invention, in a retaining step, a boss is mounted to a decorative member with a base portion of the boss being retained by a retaining portion of the decorative member. Next, in an inserting step, a shaft portion of the boss is inserted into an aperture of a resin frame. Subsequently, in an insetting step, an outer peripheral surface of a bush is insetted into the aperture of the resin frame while the shaft portion of the boss is inserted into a through bore of the bush. After that, in a fixing step, the shaft portion of the boss and the bush are fixed together by a caulking part.

4 Claims, 6 Drawing Sheets

(51) Int. Cl.
*B60R 13/04* (2006.01)
*B32B 37/12* (2006.01)
*B32B 37/14* (2006.01)
*B32B 37/18* (2006.01)

(52) U.S. Cl.
CPC .............. *B32B 37/182* (2013.01); *B60J 1/10* (2013.01); *B60R 13/04* (2013.01); *B32B 2605/00* (2013.01); *Y10T 29/49826* (2015.01)

(56) References Cited

U.S. PATENT DOCUMENTS

| | | | | |
|---|---|---|---|---|
| 3,868,789 | A * | 3/1975 | Gates | B29C 35/04 264/322 |
| 3,919,022 | A * | 11/1975 | Stefanik | B32B 17/10293 156/104 |
| 4,072,340 | A * | 2/1978 | Morgan | B60J 1/10 160/371 |
| 4,611,850 | A | 9/1986 | Fujikawa | |
| 4,700,525 | A * | 10/1987 | Nieboer | B29C 45/14065 52/204.591 |
| 4,707,958 | A * | 11/1987 | Armbruster | B60J 10/70 156/108 |
| 4,861,540 | A * | 8/1989 | Nieboer | B60J 1/006 264/263 |
| 5,339,584 | A * | 8/1994 | Ohtake | B60J 10/70 296/146.15 |
| 5,445,780 | A * | 8/1995 | Yada | B29C 47/026 156/107 |
| 5,551,197 | A * | 9/1996 | Repp | B60J 1/14 156/108 |
| 5,915,780 | A * | 6/1999 | Kobrehel | B60J 10/70 296/146.15 |
| 6,643,984 | B2 * | 11/2003 | Kato | B60J 1/10 296/146.15 |
| 8,505,262 | B2 * | 8/2013 | Senge | B60J 10/265 296/1.08 |
| 8,561,354 | B2 * | 10/2013 | Grudzinski | E05F 11/382 49/441 |
| 8,572,898 | B2 * | 11/2013 | Grudzinski | B60J 5/0402 49/441 |
| 8,646,215 | B2 * | 2/2014 | Grudzinski | B60J 1/17 49/441 |
| 8,650,802 | B2 * | 2/2014 | Grudzinski | B60J 5/0402 49/441 |
| 9,016,010 | B2 * | 4/2015 | Sonderk.æ.r | E04D 12/002 52/209 |
| 9,376,852 | B2 * | 6/2016 | Sonderk.æ.r | E06B 3/6625 |
| 2006/0156632 | A1 * | 7/2006 | Ruppert | B29C 45/14377 49/502 |
| 2013/0186018 | A1 * | 7/2013 | Grandgirard | B60J 1/10 52/204.72 |
| 2015/0017368 | A1 | 1/2015 | Kondou et al. | |

FOREIGN PATENT DOCUMENTS

| | | |
|---|---|---|
| JP | 3-19817 | 1/1991 |
| JP | 7-229356 | 8/1995 |
| JP | 10-129252 | 5/1998 |
| JP | 2003-104067 | 4/2003 |

OTHER PUBLICATIONS

International Search Report issued Feb. 25, 2014, in PCT/JP2013/081447 filed Nov. 21, 2013.

* cited by examiner

FRAME BODY-EQUIPPED VEHICLE WINDOW PLATE-LIKE BODY, AND METHOD FOR ASSEMBLING FRAME BODY-EQUIPPED VEHICLE WINDOW PLATE-LIKE BODY

TECHNICAL FIELD

The present invention relates to a plate-like body with a frame attached thereto for a vehicle window and a process for assembling the plate-like body with a frame attached thereto for a vehicle window.

BACKGROUND ART

With regard to the process for producing a glass sheet for a vehicle window, such as a windshield or a sidelite as a vehicle window of, e.g. an automobile, there has been known a production process for integrally molding a thermoplastic resin frame, along with a metal part etc. on a peripheral portion of a glass sheet by injection molding (see e.g. Patent Document 1).

The production process disclosed in Patent Document 1 is a production process called the MAW system (Module Assy Window: registered trademark). A glass sheet with a resin frame attached thereto produced by the MAW system has a thermoplastic resin frame attached to a peripheral portion thereof such that the resin frame is disposed on the glass sheet and fixed to the glass sheet so as to sandwich the peripheral portion therein.

An apparatus for producing a glass sheet with a resin frame attached thereto by using the MAW system includes a mold having a top die and a bottom die such that a cavity space is formed between the top die and the bottom die in order to dispose a peripheral portion of a glass sheet, a portion of the glass sheet close to the peripheral portion and a resin frame therein as also disclosed by Patent Document 1. After insert members, such as metal fittings, have been disposed in the cavity space in advance, a molten thermoplastic resin material is injected into the cavity space through an injection gate of the mold such that the cavity space is filled with the thermoplastic resin material. After that, the thermoplastic resin material is solidified to integrate the insert members and the thermoplastic resin material with the glass sheet. Thus, a glass sheet with a resin frame attached thereto is produced such that the resin frame has been integrally disposed on the peripheral portion.

By the way, a plate-like body with a frame attached thereto for a vehicle window, wherein a decorative member having metallic luster is fitted to a resin frame in order to provide a glass sheet for a vehicle window with a luxurious feeling and decorativeness, is disclosed in Patent Document 2.

The plate-like body with a frame attached thereto for a vehicle window disclosed in Patent Document 2 has a resin frame (resin material) and a decorative member (brilliant metal member) integrated thereto by injection molding.

The decorative member is a brilliant thin metal sheet made of a stainless steel, an aluminum alloy or the like, or a thin sheet member prepared by bonding a glossy film to a rigid resin surface with a double-faced tape or depositing a glossy paint film on a rigid resin surface, each of which is also called a decorative molding or a glossy molding.

PRIOR ART DOCUMENTS

Patent Documents

Patent Document 1: JP-A-2-182423
Patent Document 2: JP-A-3-19817

DISCLOSURE OF INVENTION

Technical Problem

The plate-like body with a frame attached thereto for a vehicle window disclosed in Patent Document 2 has, however, caused a problem in that a cycle time is extended to reduce the productivity of plate-like bodies with a frame attached thereto for a vehicle window because it is necessary to perform a task for mounting a decorative member to the cavity space of a mold during production. Further, the solution proposed by Patent Document 2 has also caused a problem in that there is a case where a decorative member is brought into contact with a mold when a molded plate-like body with a frame attached thereto for a vehicle window is taken out of the mold, and in such a case, the decorative member is damaged such that the defective rate increases to reduce the yield.

These problems can be solved by performing operation that a decorative member is post-fitted to a resin frame manufactured by injection molding or extrusion molding. For example, there is proposed an assembling process for employing a double-faced tape to bond the decorative member to the resin frame so as to integrate both members.

The assembling process for employing a double-faced tape, however, causes a difficulty in assembly performance since it takes time to affix a double-faced tape to the resin frame or a decorative member.

As another assembling process by means of post-fitting, there is also proposed an assembling process for providing a resin frame, with apertures providing a decorative member with shaft-like coupling members, inserting the coupling members into the apertures and fixing the coupling members to the resin frame so as to fix the resin frame and the decorative member together through the coupling members.

In the latter assembling process, the apertures of the resin frame are formed so as to have a sufficiently larger inner diameter than the diameter of the coupling members in consideration of the assembly performance of the decorative member to the resin frame. This creates a problem in degrading the fitting accuracy of the decorative member to the resin frame if the coupling members inserted into apertures cause displacement in the apertures during fixing.

The present invention is proposed in consideration of such circumstances and has an object to provide a plate-like body with a frame attached thereto for a vehicle window and a process for assembling the plate-like body with a frame attached thereto for a vehicle window, which are capable of providing excellent assembling performance, achieving high durability and providing a decorative member with high fitting accuracy to a resin frame in spite of being in a mode where the decorative member is post-fitted to the resin frame.

Solution to Problem

In order to attain the object, according to one mode of the present invention, there is provided a plate-like body with a frame attached thereto for a vehicle window, including a plate-like body for a vehicle window, a resin frame attached to a peripheral edge portion of the plate-like body and a decorative member fitted to the resin frame through a coupling member; the plate-like body further comprising the coupling member including a base portion to be retained in the decorative member and a shaft portion projecting from the base portion so as to be insetted into the resin frame; the decorative member including a retaining portion for retaining the base portion; the resin frame having an aperture formed therein so as to receive the shaft portion; a positioning member having a through bore formed therein to receive the shaft portion; the positioning member having an outer peripheral surface insetted into an inner peripheral surface of the aperture; and a fixing structure for fixing the shaft portion and the positioning member.

In order to attain the object, according to one mode of the present invention, there is provided a process for assembling a plate-like body with a frame attached thereto for a vehicle window, which comprises a plate-like body for a vehicle window, a resin frame attached to a peripheral edge portion of the plate-like body and a decorative member fitted to the resin frame through a coupling member; the coupling member including a base portion to be retained in the decorative member and a shaft portion projecting from the base portion so as to be insetted into the resin frame, the decorative member having a retaining portion formed therein so as to retain the base portion; the process including a retaining step of retaining the base portion of the coupling member by the retaining portion of the decorative member; an inserting step of inserting the shaft portion into an aperture of the resin frame; an insetting step of insetting an outer peripheral surface of the positioning member into the aperture of the resin frame while the shaft portion of the coupling member is inserted into a through bore of the positioning member; and a fixing step of fixing the shaft portion of the coupling member and the positioning member together.

According to one mode of the present invention, first, in the retaining step, the base portion of the coupling member is retained by the retaining portion of the decorative member. Next, in the inserting step of performing operation on a car-exterior side of the resin frame, the shaft portion is inserted into the aperture of the resin frame. In this step, it is possible to easily fit the decorative member to the car-exterior side of the resin frame because the aperture of the resin frame has a sufficiently larger inner diameter than the diameter of the shaft of the coupling member. Subsequently, in the step of performing operation on a car-interior side of the resin frame, the outer peripheral surface of the positioning member is insetted into the aperture of the resin frame while the shaft portion of the coupling member is inserted into the through bore of the positioning member. By this insetting operation, the coupling member is positioned in the aperture by the positioning member, and the gap between the aperture and the shaft portion of the coupling member is closed by the positioning member such that the shaft portion of the coupling member is retained, without play, in the aperture through the positioning member. This step increases the fitting accuracy of the decorative member to the resin frame. After that, in the fixing step of performing operation to the car-interior side of the resin frame, the shaft portion of the coupling member and the positioning member are fixed together by the fixing structure. Thus, the decorative member has an improved retaining capability to the resin frame to provide the plate-like body for a vehicle window with an extended durability.

In accordance with the latter mode of the present invention, it is possible not only to achieve an increased assembling performance and an extended durability but also to provide the decorative member with a high fitting accuracy to the resin frame.

As one mode of the process for assembling a plate-like body with a frame attached thereto for a vehicle window according to the present invention, it is preferred that the plate-like body with a frame attached thereto for a vehicle window have at least two apertures formed therein and that in the inserting step, at least two shaft portions be inserted into the apertures before the insetting step.

In a case where there are at least two apertures and at least two shaft portions, it is difficult to inset the outer peripheral surfaces of at least two positioning members into the at least two apertures, followed by performing the inserting step such that all of the at least two shaft portions are positioned in the through bores of the at least two positioning members. In accordance with the preferred mode of the present invention, it is, however, possible to position all of the at least two shaft portions in the through bores of the at least two positioning members because the at least two shaft portions are first inserted into the at least two apertures 34, followed by insetting the outer peripheral surfaces of the at least two positioning members into the at least two apertures while the at least two shaft portions are inserted into the through bores of the at least two positioning members.

As one mode of the plate-like body with a frame attached thereto for a vehicle window according to the present invention, it is preferred that the positioning member include a cylindrical body, and a flange formed on an end of the body and having an outer diameter larger than the inner diameter of the aperture of the resin frame, and that the body have an other end insetted into the aperture from a side of the resin frame opposite to the decorative member.

As one mode of the process for assembling the plate-like body with a frame attached thereto for a vehicle window according to the present invention, it is preferred that the positioning member include a cylindrical body, and a flange formed on an end of the body and having an outer diameter larger than the inner diameter of the aperture of the resin frame, and that the insetting step include insetting the body into the aperture from a side of the resin frame opposite to the decorative member such that the positioning member has an other end of the body of the positioning member located at a leading position.

According to one mode of the present invention, in the insetting step of performing operation to the car-interior side of the resin frame, the body of the positioning member is insetted into the aperture of the resin frame while the other end of the body of the positioning member is located at a leading position.

As one mode of the plate-like body with a resin frame attached thereto for a vehicle window according to the present invention, it is preferred that the coupling member be made of a resin and have the shaft portion formed with a caulking part as the fixing structure, and that the caulking part be thermally caulked to be engaged with the flange of the positioning member.

As one mode of the process for assembling the plate-like body with a frame attached thereto for a vehicle window according to the present invention, it is preferred that the coupling member be made of a resin and have the shaft portion formed with a part to be caulked, and that in the fixing step, the part to be caulked of the coupling member, which protrudes outward from the positioning member, be thermally caulked to be engaged with the flange of the positioning member.

According to one mode of the present invention, in the fixing step of performing operation to the car-interior side of the resin frame, the part to be caulked of the coupling member, which protrudes outward from the positioning member, is thermally caulked to be engaged (brought into contact) with the flange of the positioning member. Thus, it is possible to have a further improved retaining capability to the resin frame.

If a plasticizer (compound synthesized from an acid and an alcohol) dissolves out of the resin frame and adheres to the caulking part, the caulking part is broken because of being lowered in strength in some cases. According to one mode of the present invention, it is, however, possible to prevent the plasticizer from adhering to the caulking part because the flange of the positioning member performs the function of blocking a plasticizer having dissolved out of the resin frame. Thus, it is possible to avoid the damage of the caulking part caused by the adherence of a plasticizer to the caulking part. In this case, the positioning member is preferably made of a material that is not subjected to a decrease in strength by adherence of a plasticizer, for example, a resin containing no plasticizer, such as rigid PVC, or metal material.

Although the part to be caulked of the coupling member is made of a resin capable of being subjected to thermal caulking, such as an ABS resin or ASA resin, the entire coupling member is preferably made of such a resin capable of being subjected to thermal caulking in terms of simple production.

Although it is exemplified that the positioning member is formed in a cylindrical shape as one mode of the present invention, the present invention is not limited to this mode. For example, the shaft portion may be formed in a substantially polygonal shape, such as a square shape or a hexagonal shape, instead of a circular shape, or a crisscross shape or a star shape, in section, and the through bore of the positioning member may be configured such that the shaft portion having such a cross-sectional shape is insetted into the through bore without play.

Although it is exemplified that the fixing structure is formed as a caulking part capable of being subjected to thermal caulking as one mode of the present invention, the present invention is not limited to this mode. For example, the fixing structure may be configured as a combination of a bolt and a nut to be fastened by the bolt wherein the shaft portion of the coupling member is formed so as to serve as the bolt, or any other known fixing structure may be properly applicable. Further, the fixing structure may be formed as a combination of the above-mentioned permanent type of fixing structure and a temporary fixing structure for temporarily positioning and fixing the positioning member to the shaft portion of the coupling member. Examples of the temporary fixing structure include fixing using a friction force, fixing using a combination of a recess and a projection, and an adhesive tape.

As one mode of the plate-like body with a frame attached thereto for a vehicle window, it is preferred that the resin frame be integrally molded to the peripheral edge portion of a plate-like body for a vehicle window.

According to one mode of the present invention, the decorative member can be fitted to the resin frame to produce a plate-like body with a frame attached thereto for a vehicle window.

As one mode of the process for assembling a plate-like body with a frame attached thereto for a vehicle window, it is preferred that the process further include a temporarily fixing step of temporarily fixing the decorative member with the coupling member retained therein, to the resin frame between the inserting step and the insetting step.

According to one mode of the present invention, the decorative member is temporarily fixed to the resin frame in the temporarily fixing step with the result that the shaft portion of the coupling member is prevented from coming out of the aperture of the resin frame when the positioning member is insetted into the aperture in the insetting step. Thus, it is possible to have an improved work efficiency in the insetting step. As the temporary fixing structure, a detachable adhesive tape is preferred.

The "plate-like body with a frame attached thereto for a vehicle window" recited in Description means a plate-like body for a vehicle window, which has a resin frame attached to a peripheral edge portion thereof, a decorative member being post-fitted to the frame. The resin frame means a gasket, a molding, a weather strip, a rubber seal or the like, which is attached to a peripheral edge portion of a plate-like body for a vehicle window to close the gap between a window frame of a vehicle and the plate-like body for a vehicle window. The resin frame may be attached to the entire peripheral edge portion of a plate-like body for a vehicle window or be discontinuous at a position of the entire peripheral edge portion, or may be attached to one side or sides of a plate-like body for a vehicle window.

The "synthetic resin" as the material for the "resin frame" may be, for example, a thermoplastic resin. Examples of the thermoplastic resin include a common thermoplastic resin selected from the group consisting of a vinyl chloride resin (PVC) or a polyolefin-based, polyester-based, polystyrene-based, polyamide-based or polyurethane-based elastomer, although being not limited to these materials.

Examples of the "plate-like body for a vehicle window" include a transparent or translucent glass sheet and a transparent or translucent resin sheet. A colored glass sheet or resin sheet is also applicable so long as it has a sufficient see-through property.

The "decorative member" means a brilliant thin metal sheet made of a stainless steel, an aluminum alloy or the like, or a thin sheet member prepared by bonding a glossy film to a rigid resin surface with a double-faced tape or depositing a glossy paint film on a rigid resin surface. Since the present invention is characterized in that a decorative member is fitted to a resin frame through a separate coupling member being subjected to thermal caulking, it is preferred that the "decorative member" be not a thin resin member, to which a coupling member capable of being subjected to thermal caulking can be integrally molded, but such a brilliant thin metal sheet, to which a coupling member capable of being subjected to thermal caulking cannot be integrally molded.

Advantageous Effects of Invention

In accordance with the plate-like body with a frame attached thereto for a vehicle window and the process for assembling the plate-like body with a resin frame attached thereto for a vehicle window of the present invention, it is possible to provide excellent assembling performance, to achieve high durability and to provide a decorative member with high fitting accuracy to a resin frame in spite of being in a mode where the decorative member is post-fitted to the resin frame.

DESCRIPTION OF EMBODIMENTS

Now, the plate-like body with a frame attached thereto for a vehicle window according to one mode of the present invention and the process for assembling the plate-like body with a frame attached thereto for a vehicle window according to one mode of the present invention will be described in reference to preferred embodiments shown in the accompanying drawings.

Figure 1:
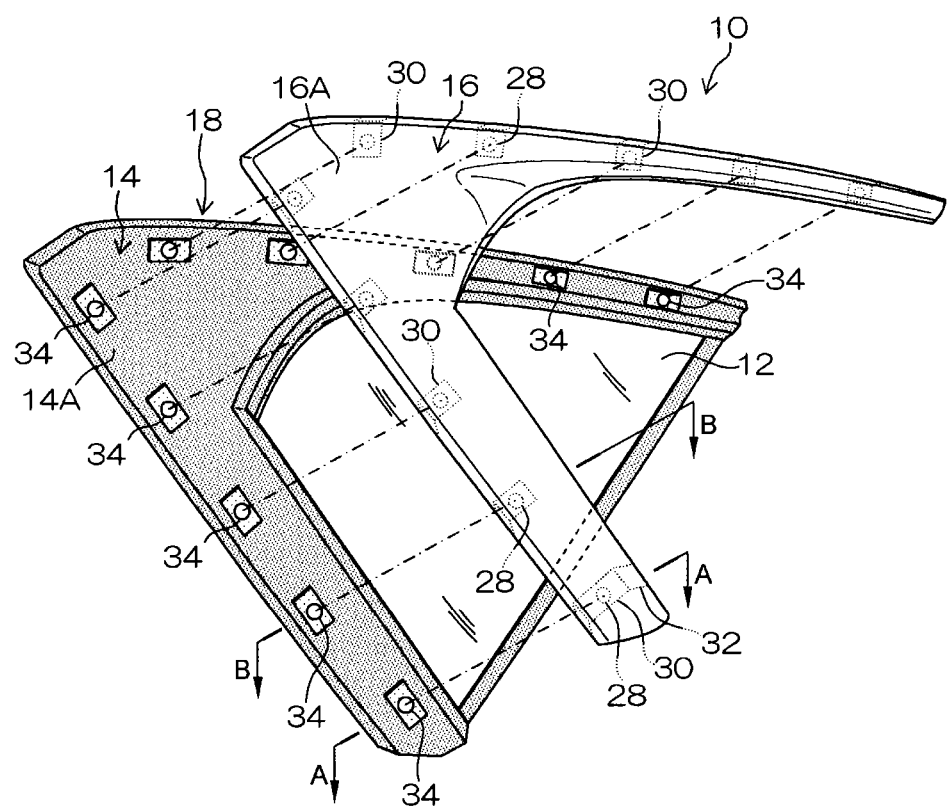
FIG. 1 is a perspective view showing an example of how to assemble a plate-like body with a frame attached thereto for a vehicle window according to an embodiment.

FIG. 1 is a perspective view showing an example of how to assemble a plate-like body with a frame attached thereto for a vehicle window 10 according to an embodiment.

The plate-like body with a frame attached thereto for a vehicle window 10 is constituted by a glass sheet (plate-like body for a vehicle window) 12, a synthetic resin frame 14 integrally molded to a peripheral edge portion of the glass sheet 12 by a production process called the MAW system, and a decorative member 16 made of stainless steel. Although the plate-like body with a frame attached thereto for a vehicle window 10 in FIG. 1 is configured in a mode where the decorative member 16 is post-fitted, through bosses 22 (coupling members: see FIGS. 2 and 3) to the resin frame 14 integrally molded to the glass sheet 12, the plate-like body is not limited to this mode. The plate-like body may be configured in a mode where the decorative member 16 is post-fitted, through the bosses 22, to a single resin frame produced by extrusion molding. Now, a complex with the resin frame 14 integrally molded to the glass sheet 12 is called a glass sheet with a resin frame attached thereto 18. By simply post-fitting the decorative member 16 to this glass sheet with a resin frame attached thereto 18, it is possible to produce the plate-like body with a frame attached thereto for vehicle window 10. The decorative member 16 has a car-exterior side 16A serving as a decorative surface. The bosses 22 will be described in detail later.

The resin frame 14 may be attached to the entire peripheral edge portion of the glass sheet 12, to one side of the glass sheet 12, or to a part of one side so as to have edge portions. The glass sheet 12 may be formed in a triangular or square shape, and no specific limitations in shape are imposed on the glass sheet. The glass sheet 12 may be flat or curved. The glass sheet 12 may be a single layer glass sheet or may be made of laminated glass or tempered glass. The plate-like body is not limited to the glass sheet 12, and the plate-like body may be a plate-like body made of a synthetic resin, a laminate prepared by combining a plate-like body made of a synthetic resin and a glass sheet, or the like. The plate-like body made of a synthetic resin may be, for example, a plate-like body made of a common transparent organic resin material, such as a polycarbonate-based, a polystyrene-based or polymethylmethacrylate-based resin material, or may be configured by laminating at least two layers made of such a material. Such plate-like bodies are applicable to a vehicle window, such as a windscreen (windshield), front bench glass, roof glass, side door glass, rear sidelite, rear quarter glass, and rear windshield (backlite).

The resin frame 14 is a member mainly made of a synthetic resin and collectively means a gasket, a molding, a weather strip, rubber seal or the like, which is employed to close the gap between a window frame for a vehicle (denoted by reference numeral 20 in FIGS. 2 and 3) and the glass sheet 12 used as a glass sheet for a vehicle window.

Examples of the synthetic resin usable as the material for the resin frame 14 include a thermoplastic resin and a thermosetting resin. The thermoplastic resin may be a flexible material prepared by employing, as the base, one or a mixture of two or more selected from the group consisting of polyvinyl chloride (PVC), a copolymer of vinyl chloride and ethylene, a copolymer of vinyl chloride and vinyl acetate, a copolymer of vinyl chloride and propylene, and a copolymer of vinyl chloride, ethylene and vinyl acetate, adding an additive, such as a plasticizer, to the base, and compounding them. Another thermoplastic resin may be blended to the thermoplastic resin thus prepared. For example, one or a mixture of two or more selected from the group consisting of chlorinated polyethylene, a urethane-modified vinyl chloride resin, a urethane resin, a polyester resin, a liquid crystal polymer, an acrylic resin, rubber containing at least NBR or SBR etc., an EVA resin and an ABS resin may be employed. The thermosetting resin is preferably made of urethane RIM.

The peripheral edge portion of the glass sheet 12 with the resin frame 14 integrally molded thereto may have an adhesive layer disposed thereon in advance. The adhesive layer may contain a urethane-based, phenol-based, acryl-based, nylon-based, or epoxy-based one pack or two or more pack adhesive.

The decorative member 16 is a brilliant thin metal sheet made of stainless steel, an aluminum alloy or the like, or a thin sheet member prepared by bonding a glossy film to a rigid resin surface with a double-face tape or depositing a glossy thin film on a rigid resin surface, each of which is fitted to the resin frame 14 to provide the glass sheet with a resin frame attached thereto 18 with a luxurious feeling and decorativeness.

The plate-like body with a frame attached thereto for a vehicle window 10 according to the embodiment is characterized in that the bosses 22 separately prepared from a resin material (see FIGS. 2 and 3) are thermally caulked to the resin frame 14 so as to fit the decorative member 16 to the resin frame 14. From this point of view, the decorative member 16 is preferably a brilliant thin metal sheet made of stainless steel or the like incapable of being integrally molded with the resin bosses 22, instead of a thin resin member capable of being integrally molded with the resin bosses 22 capable of subjected to thermal caulking.

Now, the plate-like body with a frame attached thereto for a vehicle window 10 according to the embodiment will be described.

Figure 2:
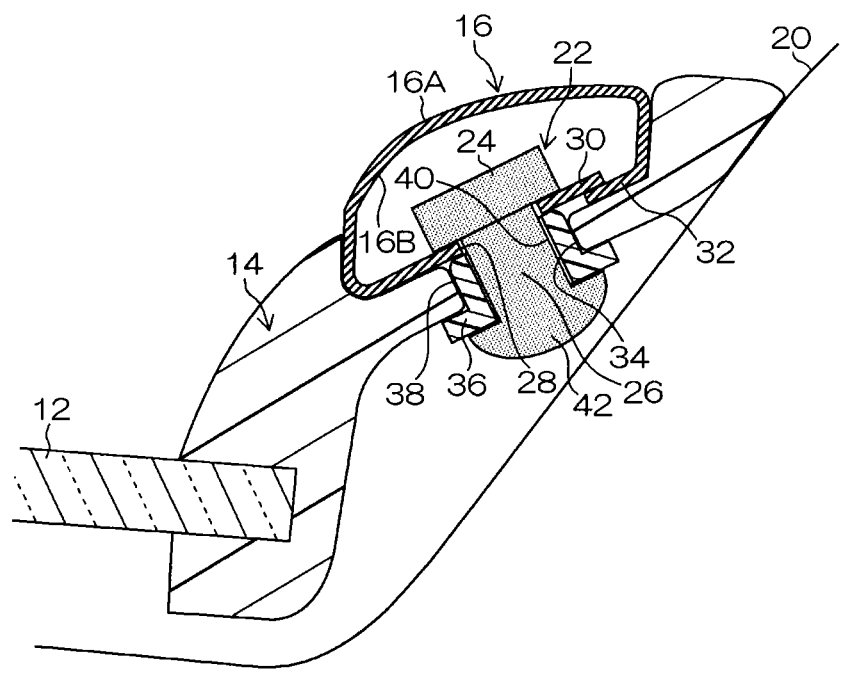
FIG. 2 is a cross-sectional view of the plate-like body with a frame attached thereto for a vehicle window, to which a decorative member has been fitted, taken along line A-A in FIG. 1.
Figure 3:
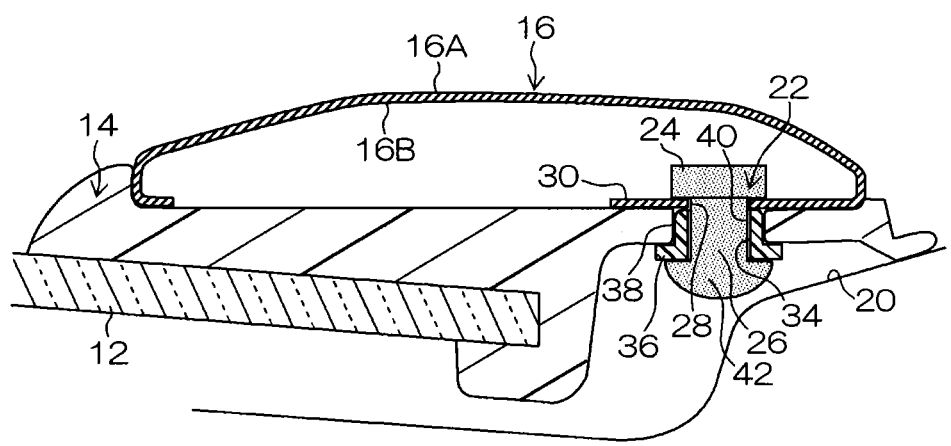
FIG. 3 is s a cross-sectional view of the plate-like body with a frame attached thereto for a vehicle window, to which a decorative member has been fitted, taken along line B-B in FIG. 1.

FIG. 2 is a cross-sectional view of essential parts of the plate-like body with a frame attached thereto for a vehicle window, which has the decorative member 16 fitted to the resin frame 14, and a cross-sectional view of the plate-like body with a frame attached thereto for a vehicle window taken alone line A-A in FIG. 1, which has the decorative member 16 fitted to the resin frame 14. FIG. 3 is a cross-sectional view of the plate-like body with a frame attached thereto for a vehicle window 10 taken along line B-B in FIG. 1, which has the decorative member 16 fitted to the resin frame 14. In FIGS. 2 and 3, explanation will be made with identical or similar members being denoted by like reference numerals.

The bosses 22, which are employed to post-fit the decorative member 16 to the resin frame 14, may be made of a material capable of being thermally caulked, such as an ABS resin or an ASA resin. Each of the bosses 22 is constituted by a base portion 24 and a shaft portion 26. The base portion 24 is formed in a disk shape, and the shaft portion 26 is integrally formed with the base portion 24 so as to protrude from the base portion 24 and is formed in a columnar shape having a smaller diameter than the base portion 24.

As shown in FIGS. 2 and 3, the decorative member 16 includes retaining portions 28 engageable with base portions 24 of the bosses 22 for retaining the base portions 24. Each of the retaining portion 28 is constituted by an aperture or a groove formed in a projecting piece 30. Each projecting piece 30 is formed to be bent toward a car-interior side 16B of the decorative member 16, projecting from one edge from the decorative member 16. Although the projecting piece 30 shown in FIG. 3 is configured cantilevered by the one end of the decorative member 16, the projecting piece 30 shown in FIG. 2 is brought into contact with and supported by a projecting piece 32 projecting from the other edge of the decorative member 16 to have an increased rigidity.

On the other hand, the resin frame 14 has a plurality of apertures 34 formed therein along the edge portion of the glass sheet with a resin frame attached thereto 18 so as to receive the shaft portions 26 of the bosses 22 as shown in FIG. 1.

Figure 4:
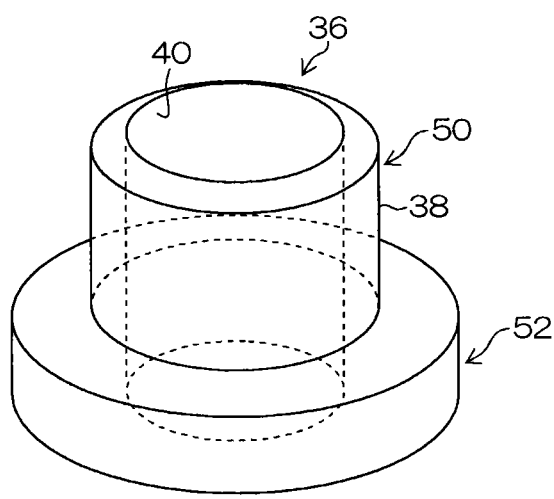
FIG. 4 is a perspective view of a bush in its entirety.

As shown in FIGS. 2 and 3, each of the apertures 34 has a bush (positioning member) 36 fitted thereinto so as to position the shaft portion 26 of its corresponding boss 22. FIG. 4 is a perspective view of a bush 36.

Each of the bushes 36 includes an outer peripheral surface 38 adapted to be insetted into its corresponding aperture 34 of the resin frame 14, and a through bore 40 for receiving the shaft portion 26 of its corresponding boss 22 as shown in FIGS. 2 and 3. The shaft portions 26 of the bosses 22 are positioned in and fixed to the apertures 34 by the bushes 36.

The shaft portion 26 of each of the bosses 22 includes a caulking portion (fixing structure) 42 for fixing the shaft portion 26 and its corresponding bush 36. The caulking portion 42 will be described later.

Now, the process for assembling a plate-like body with a frame attached thereto for a vehicle window 10 according to an embodiment of the present invention will be described.

This assembling process includes a retaining step of retaining the base portions 24 of the bosses 22 by the retaining portions 28 of the decorative member 16, an inserting step of inserting the shaft portions 26 of the bosses 22 into the apertures 34 of the resin frame 14, an insetting step of insetting the outer peripheral surfaces 38 of the bushes 36 into the apertures of the resin frame 16 while the shaft portions 26 of the bosses 22 are inserted into the through bores 40 of the bushes 36, and a fixing step of fixing the shaft portions 26 of the bosses 22 and the bushes 36 together by the caulked portions 42.

Specifically, first, in the retaining step, the base portions 24 of the bosses 22 are retained by the retaining portions 28 of the decorative member 16 to mount the bosses 22 to the decorative member 16.

Figure 5:
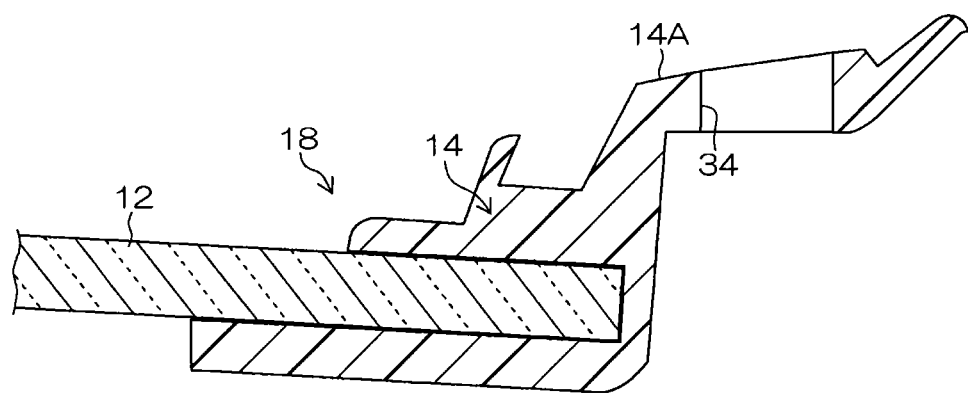
FIG. 5 is a cross-sectional view showing essential parts of the glass sheet with a resin frame attached thereto at a stage before the decorative member has been fitted.
Figure 6:
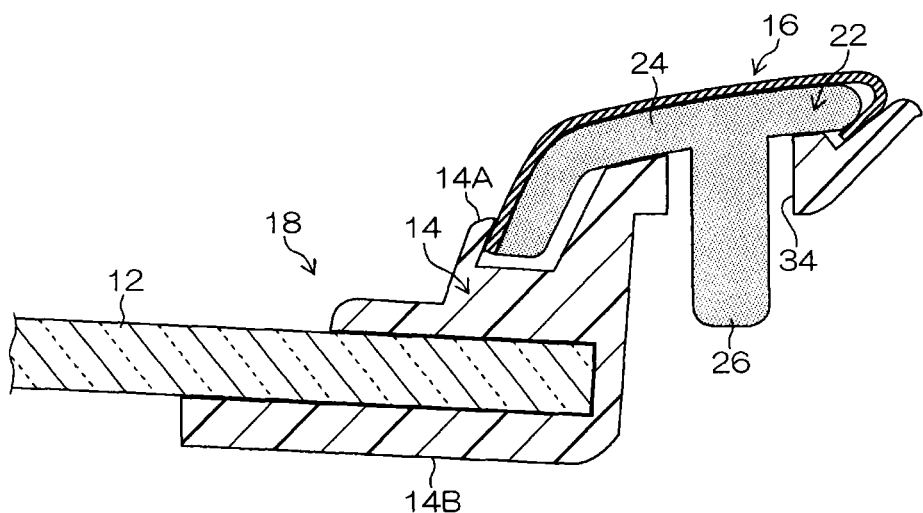
FIG. 6 is a cross-sectional view showing essential parts of the glass sheet with a resin frame attached thereto at a stage after the shaft portion of a boss has been inserted into an aperture of the resin frame.

Next, in the inserting step of performing operation on a car-exterior side 14A of the resin frame 14 for the glass sheet with a resin frame attached thereto 18 prior to the mounting of the decorative member 16 as shown in FIG. 5, the shaft portions 26 of the bosses 22 are inserted into the apertures 34 of the resin frame 14 as shown in FIG. 6. In that time, it is possible to easily fit the decorative member 16 to the car-exterior side 14A of the resin frame 14 because the apertures 34 of the resin frame 14 are formed so as to have a sufficiently larger inner diameter than the outer diameter of the shaft portions 26 of the bosses 22.

Figure 7:
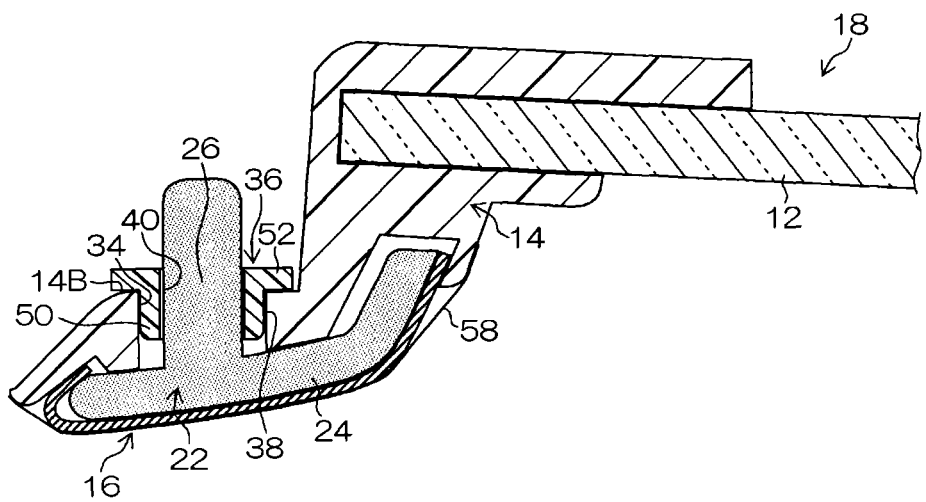
FIG. 7 is a cross-sectional view showing essential parts of the glass sheet with a resin frame attached thereto at a stage after the bush has been inserted into the shaft portion of the boss.

Then, in the step of performing operation on the car-interior side 14B of the resin frame 14, the glass sheet with a resin frame attached thereto 18, to which the decorative member 16 has been fitted, is placed in an inverted position from the posture shown in FIGS. 5 and 6 to the posture shown in FIG. 7. While the bushes 36 are fitted into the shaft portions 26 of the bosses 22 in that state, i.e. the shaft portions 26 of the bosses 22 are inserted into the through bores 40 of the bushes 36, the outer peripheral surfaces of the bushes 36 are insetted into the apertures 34 of the resin frame 14. By this insetting operation, the bosses 22 are positioned in the apertures 34 by the bushes 36, and the gaps between the apertures 34 and the shaft portions 26 of the bosses 22 are closed by the bushes 36 such that the shaft portions 26 of the bosses 22 are retained, without play, in the apertures 34 through the bushes 36. Thus, it is possible to have an improved fitting accuracy of the decorative members 16 to the resin frame 14 in terms of position.

After that, in the fixing step of performing operation to the car-interior side 14B of the resin frame 14, the shaft portions 26 of the bosses 22 and the bushes 36 are fixed together by the caulked portions 42.

Figure 8:
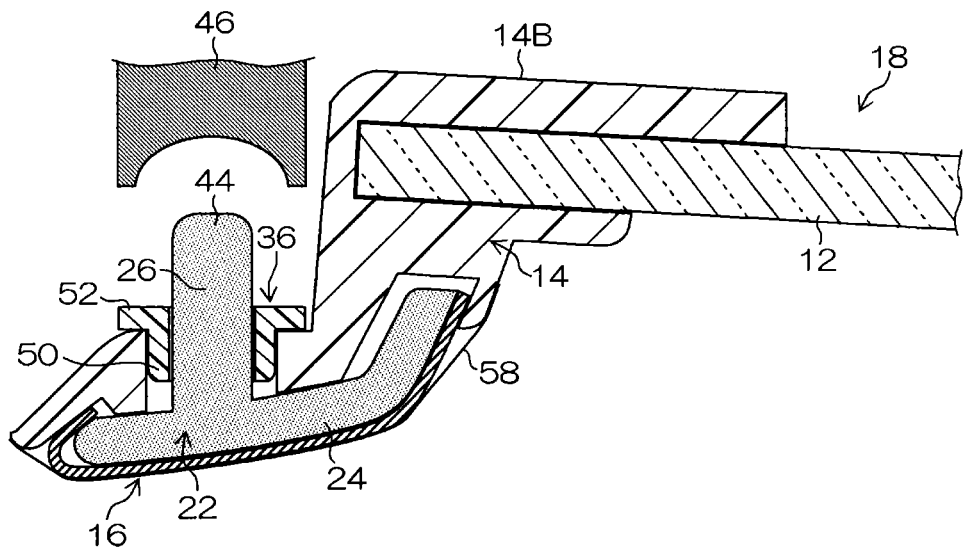
FIG. 8 is an enlarged cross-sectional view showing essential parts of the glass sheet with a resin frame attached thereto in a stage before a part to be caulked in the shaft portion of the boss has been subjected to thermal caulking.
Figure 9:
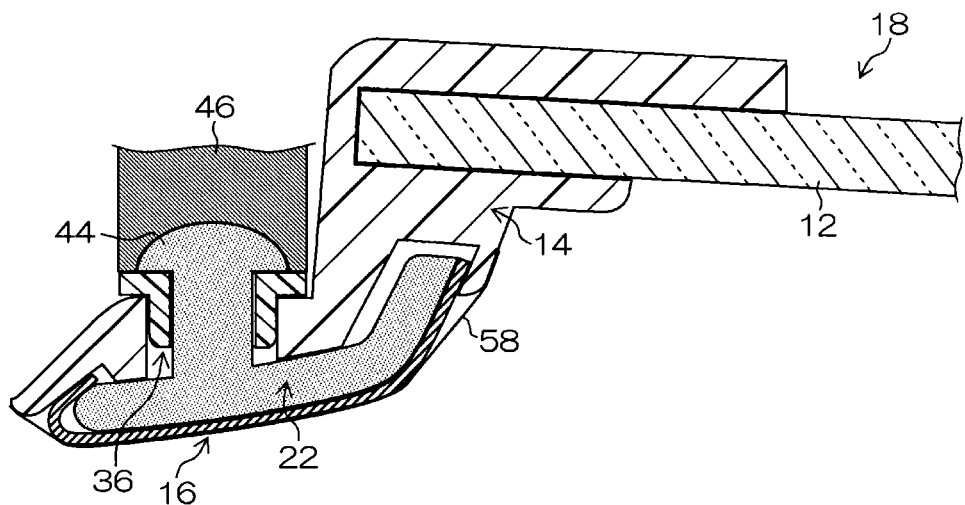
FIG. 9 is an enlarged cross-sectional view showing essential parts of the glass sheet with a resin frame attached thereto in a state where the part to be caulked is being subjected to thermal caulking by a heating chip.
Figure 10:
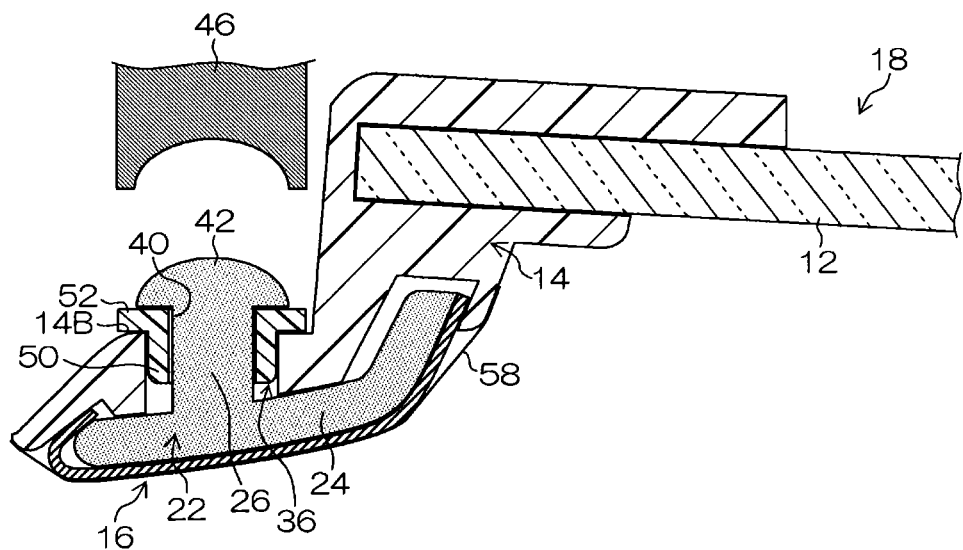
FIG. 10 is an enlarged cross-sectional view showing essential parts of the plate-like body with a frame attached thereto, where the part to be caulked has been subjected to thermal caulking to form a caulked part.

FIG. 8 is an enlarged cross-sectional view showing essential parts of the glass plate with a resin frame attached thereto 18, having the decorative member 16 attached thereto, in a state just before a part to be caulked 44 in the shaft portion 26 of each of the bosses 22 is subjected to thermal caulking, FIG. 9 is an enlarged cross-sectional view showing essential parts of the glass sheet with a resin frame attached thereto 18, having the decorative member 16 attached thereto, in a state where the part to be caulked 14 is being subjected to thermal caulking by a heating chip 46, and FIG. 10 is an enlarged cross-sectional view showing essential parts of the plate-like body with a frame attached thereto for a vehicle window 10, where a part to be caulked 42 has been subjected to thermal caulking to form a caulked part.

As shown in FIGS. 2, 3 and 10, each of the caulked portions 42 is formed so as to have an outer diameter larger than the inner diameter of the through bore 40 of each of the bushes 36. In accordance with the plate-like body with a frame attached thereto for a vehicle window 10 according to the embodiment, the provision of the caulked portions 42 improves the retaining capability of the decorative member 16 to the resin frame 14, improving the durability of the plate-like body with a frame attached thereto for a vehicle window 10.

As described above, in accordance with the plate-like body with a frame attached thereto for a vehicle window 10 according to the embodiment, it is possible to provide excellent assembling performance, to achieve high durability and to provide the decorative member 16 with high fitting accuracy to the resin frame 14 in terms of position even in a mode where the decorative member 16 is post-fitted to the resin frame 14.

It should be noted that the above-mentioned "car-exterior side 14A" of the resin frame 14 means a side of the resin frame that is positioned on an exterior side of a vehicle when the plate-like body with a frame attached thereto for a vehicle window 10 has been assembled to a window frame 20 of the vehicle (see FIGS. 2 and 3) and that the above-mentioned "car-interior side 14B" means a side of the resin frame that is positioned on an interior side of the car when the plate-like body with a frame attached thereto for a vehicle window 10 has been assembled to the window frame of the vehicle 20.

It is repeated that the assembling process according to the embodiment is an assembling process for inserting the shaft portions 26 of the bosses 22 into the apertures 34 of the resin frame 14, followed by insetting the bushes 36 into the apertures 34 of the resin frame 14. This leads to improve the assembling performance of the decorative member 16 to the resin frame 14.

On the other hand, in an assembling process for insetting the bushes 36 into the apertures 34 of the resin frame 14, followed by inserting the shaft portions 26 of the bosses 22 into the through bores 40 of the bushes 36, it is necessary to insert the shaft portions 26 of the bosses 22 into the through bores 40 of the bushes 36 with pinpoint accuracy. For this reason, it is difficult to align the shaft portions 26 of the bosses 22 with the through bores 40 of the bushes 36 with the result that the assembling performance of the decorative member 16 to the resin frame 14 is degraded. It is also difficult to insert the plural bosses 22 into the through bores 40 of the plural bushes 36 with the bosses being all positioned in the through bores because the decorative member 16 is provided with the plural bosses 22. The process for assembling the plate-like body with a frame attached thereto for a vehicle window 10 according to the embodiment can solve these problems.

Although the shaft portions 26 of the bosses 22 are preferred to be clearance-fitted into the through bores 40 of the bushes 36 in terms of ease in insertion (work efficiency) of the shaft positions 26 to the through bores 40, the shaft portions are preferred to be intermediate-fitted into the through bores from the point of view of improving the retaining capability of the shaft positions 26 to the bushes 36.

Each of the bushes 36 is constituted by a cylindrical body 50, and a flange 52 formed on one end of the body 50 and having an outer diameter larger than the inner diameter of the apertures 34 of the resin frame 14 as shown in FIG. 4. In the insetting step shown in FIG. 7, each of the bushes 36 is inserted into its corresponding aperture 34 from a side of the resin frame 14 opposite to the decorative member 16, i.e. the car-interior side 14B of the resin frame 14 with the body 50 being positioned to have its leading edge located at a leading position.

At a time when the flange 52 of each of the bushes 36 is brought into contact with the car interior side 14B of the resin frame 14, the insetting operation of the body 50 of each of the bushes ends. The body 50 of each of the bushes 36 is preferred to have a length set such that the leading edge of the body 50 is not brought into contact with the base portion 24 of its corresponding boss 22 when the flange 52 of each of the bushes 36 is brought into contact with the car-interior side 14B of the resin frame 14. This facilitates the operation required for the insetting step because the insetting step ends at a time when the flange 52 of each of the bushes 36 is brought into contact with the car-interior side 14B of the resin frame 14.

It should be noted that each of the bushes 36 may be configured to have the body 50 and the flange 52 formed as an integral member or as separate members. When both members are formed as separate members, the body 50 serves as a collar while the flange 52 functions as a washer.

In accordance with the plate-like body with a frame attached thereto for a vehicle window 10 according to the embodiment, when a force is applied to the decorative member 16 in a direction of removing the decorative member 16 from the resin frame 14 shown in FIG. 10, the force is transmitted from the base portions 24 of the bosses 22 to the flange portions 52 of the bushes 36 through the shaft portions 26 and the caulked portions 42. Since the flange portions 52 have a diameter larger than the inner diameter of the apertures 52 of the resin frame 14, the flanges 52 are brought into contact with the car-interior side 14B of the resin frame 14 to receive the force. By this arrangement, even if the force is applied to the decorative member 14, the decorative member 16 is prevented from being easily disengaged from the resin frame 14 because of having an improved retaining capability to the resin frame 14.

If a plasticizer (compound synthesized from an acid and an alcohol) dissolves out of the resin frame 14 and adheres to a caulking part 42, the caulking part 42 is broken because of being lowered in strength in some cases. The plate-like body with a frame attached thereto for a vehicle window 10 according to the embodiment can, however, prevent such a plasticizer from adhering to a caulking part 42 because the flanges 52 of the bushes 36 have the function of blocking such a plasticizer dissolving out from the resin frame 14. Thus, it is possible to prevent the breakage of a caulking part 42 caused by the adherence of a plasticizer to the caulking parts 42. In this case, the bushes 36 are preferably made of a material that is not subjected to a decrease in strength by adherence of a plasticizer, for example, a resin containing no plasticizer, such as rigid PVC, or a metal material.

The part to be caulked 44 of a boss 22 shown in FIG. 8 is made of a resin capable of being subjected to thermal caulking, such as an ABS resin or an ASA resin. Each of the bosses 22 is preferably molded from a material capable of being subjected to thermal caulking in its entirety in terms of simple production of each of the bosses 22.

Figure 11:
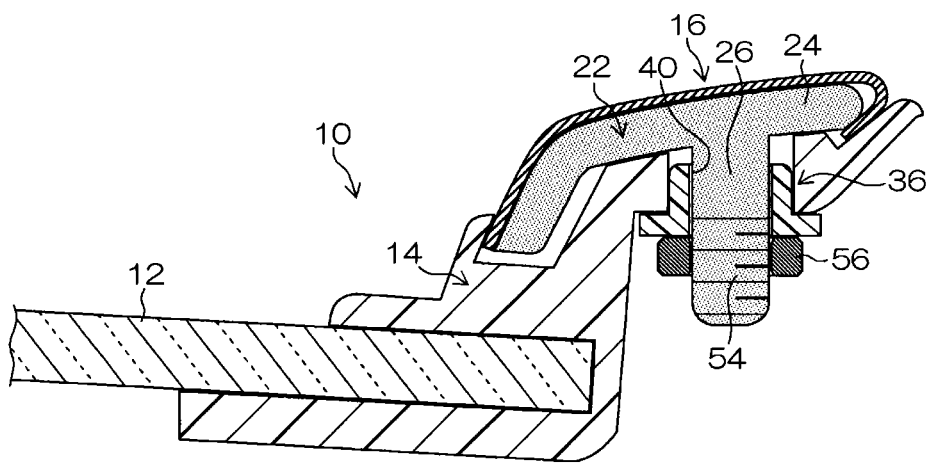
FIG. 11 is an enlarged cross-sectional view showing essential parts of a plate-like body with a frame attached thereto where a combination of a bolt and a nut is employed for fixing.

Although the caulking parts 42, to which are capable of subjected to thermal caulking, have been exemplified as the fixing structure in the embodiments, the present invention is not limited to these embodiments. For example, the fixing structure may be configured as combinations of a bolt 54 and a nut 56 to be fastened by the bolt wherein the shaft portion 26 of each of the bosses 22 is formed so as to serve as a bolt 54 as in a coupling member in a modified embodiment shown in FIG. 11. In other words, the fixing structure may have any mode so long as each coupling member (including a boss 22 and a bolt 54) can be fixed together to its counterpart positioning member (bush 36). It is of course that each nut 56 has a diameter larger than the through bore 40 of each bush 36.

Further, it is preferred that the process include a temporarily fixing step of temporarily fixing the decorative member 14 with the bosses 22 retained therein, to the resin frame 14 at least between the inserting step and the insetting step as shown in FIG. 7 to FIG. 10. Thus, the decorative member 16 is temporarily fixed to the resin frame 14 in the temporary fixing step with the result that the shaft portions 26 of the bosses 22 can be prevented from coming out of the apertures 34 of the resin frame 14 when the bushes 36 are insetted into the apertures 34 in the insetting step shown in FIG. 7. Thus, it is possible to have an improved work efficiency in the insetting step. As the temporary fixing structure, it is preferred to employ a detachable adhesive tape 58. The adhesive tape 58 may be detached from the resin frame 14 and the decorative member 16 after completion of the fixing step shown in FIG. 10.

INDUSTRIAL APPLICABILITY

The plate-like body with a frame attached thereto for a vehicle window and the process for assembling the plate-like body with a resin frame attached thereto for a vehicle window according to the present invention are applicable to the production of a vehicle window, which is capable of being provided with excellent assembling performance and achieving high durability and being provided with high fitting accuracy.

REFERENCE SYMBOLS

10: plate-like body with a frame attached thereto for a vehicle window, 12: glass sheet, 14: resin frame, 16: decorative member, 16A: car-exterior side, 16B: car-interior side, 18: glass sheet with a resin frame attached thereto, 20: window frame of vehicle, 22: boss, 24: base portion, 26: shaft portion, 28: retaining portion, 30: projecting piece, 32: projecting piece, 34: aperture, 36: bush, 38: outer peripheral surface, 40: through bore, 42: caulking part, 44: part to be caulked, 46: heating chip, 50: body, 52: flange, 54: bolt, 56: nut, 58: adhesive tape

What is claimed is:

1. A plate-like body with a frame attached thereto for a vehicle window, comprising a plate-like body for a vehicle window, a resin frame attached to a peripheral edge portion of the plate-like body and a decorative member fitted to the resin frame through a coupling member; the plate-like body further comprising:
   the coupling member including a base portion to be retained in the decorative member and a shaft portion projecting from the base portion so as to be insetted into the resin frame;
   the decorative member including a retaining portion for retaining the base portion;
   the resin frame having an aperture formed therein so as to receive the shaft portion;
   a positioning member having a through bore formed therein so as to receive the shaft portion;
   the positioning member having an outer peripheral surface insetted into an inner peripheral surface of the aperture; and
   a fixing structure for fixing the shaft portion and the positioning member.

2. The plate-like body with a frame attached thereto for a vehicle window according to claim 1, wherein the positioning member includes a cylindrical body, and a flange formed on an end of the body and having an outer diameter larger than the inner diameter of the aperture of the resin frame, and that the body has an other end insetted into the aperture from a side of the resin frame opposite to the decorative member.

3. The plate-like body with a frame attached thereto for a vehicle window according to claim 2, wherein the coupling member is made of a resin and has the shaft portion formed with a caulking part as the fixing structure; and
   the caulking part is thermally caulked to be engaged with the flange of the positioning member.

4. The plate-like body with a frame attached thereto for a vehicle window according to claim 1, wherein the resin frame is integrally molded to the peripheral edge portion of the plate-like body for a vehicle window.

* * * * *